United States Patent
Gunnarsson et al.

(10) Patent No.: US 11,277,810 B2
(45) Date of Patent: Mar. 15, 2022

(54) METHOD AND APPARATUS FOR HANDLING POSITIONING OF A TARGET DEVICE IN A COMMUNICATIONS NETWORK

(71) Applicant: Telefonaktiebolaget LM Ericsson (publ), Stockholm (SE)

(72) Inventors: Fredrik Gunnarsson, Linköping (SE); Sara Modarres Razavi, Linköping (SE); Henrik Rydén, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 86 days.

(21) Appl. No.: 16/638,012

(22) PCT Filed: Jul. 11, 2018

(86) PCT No.: PCT/SE2018/050758
§ 371 (c)(1),
(2) Date: Feb. 10, 2020

(87) PCT Pub. No.: WO2019/032010
PCT Pub. Date: Feb. 14, 2019

(65) Prior Publication Data
US 2020/0178200 A1 Jun. 4, 2020

Related U.S. Application Data

(60) Provisional application No. 62/544,066, filed on Aug. 11, 2017.

(51) Int. Cl.
*H04W 64/00* (2009.01)
*G01S 5/02* (2010.01)
(Continued)

(52) U.S. Cl.
CPC ......... *H04W 64/003* (2013.01); *G01S 5/0263* (2013.01); *H04W 4/023* (2013.01);
(Continued)

(58) Field of Classification Search
CPC ... H04W 64/003; H04W 4/023; H04W 24/08; H04W 24/10; H04W 36/0083; G01S 5/0263
(Continued)

(56) References Cited

U.S. PATENT DOCUMENTS
9,258,727 B2 2/2016 Kim et al.
10,045,380 B2 8/2018 Rune et al.
(Continued)

FOREIGN PATENT DOCUMENTS
RU 2467518 C2 11/2012
WO 2016126847 A1 8/2016

OTHER PUBLICATIONS
3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.6.0, Jun. 2018, 1-171.
(Continued)

*Primary Examiner* — Obaidul Huq
(74) *Attorney, Agent, or Firm* — Christopher & Weisberg, P.A.

(57) ABSTRACT

The embodiments herein relate to a method, performed by a target device (10), for handling positioning of the target device (10). The target device obtains, from a network node (20), a sensor reporting configuration. The target device obtains sensor measurements. The target device determines a reporting scope based on the obtained sensor measurements according to the obtained sensor reporting configuration. The target device sends, to the network node (20), a
(Continued)

Figure 1:
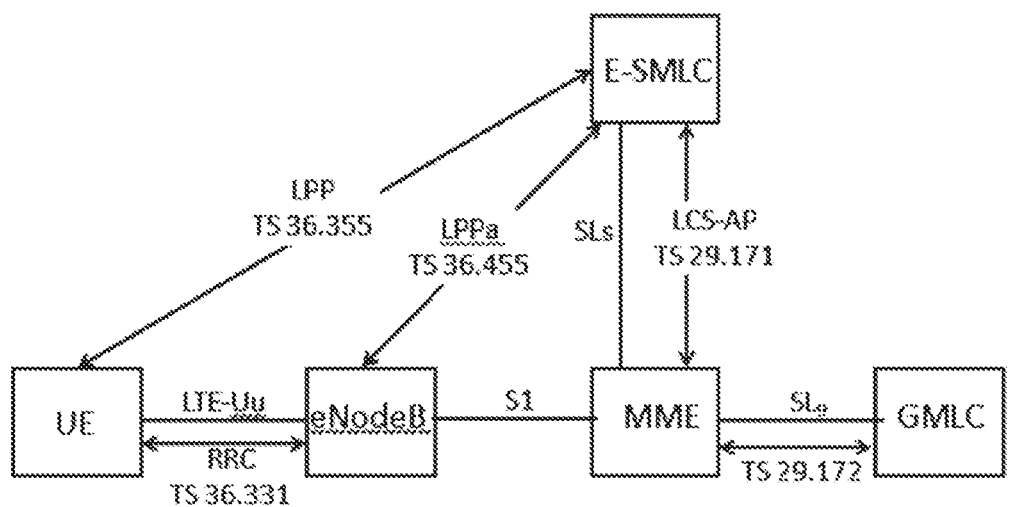

measurement report comprising the sensor measurements according to the determined reporting scope, wherein the measurement report comprises a displacement of the target device relative to a reference position. The embodiments further relate to a a corresponding method performed by the network node (20).

14 Claims, 11 Drawing Sheets

(51) Int. Cl.
  *H04W 4/02* (2018.01)
  *H04W 24/08* (2009.01)
  *H04W 24/10* (2009.01)
  *H04W 36/00* (2009.01)
(52) U.S. Cl.
  CPC .......... *H04W 24/08* (2013.01); *H04W 24/10* (2013.01); *H04W 36/0083* (2013.01)
(58) Field of Classification Search
  USPC .................................................. 370/351, 352
  See application file for complete search history.

(56) References Cited

U.S. PATENT DOCUMENTS

| | | |
|---|---|---|
| 2013/0307723 A1 | 11/2013 | Garin et al. |
| 2015/0045056 A1 | 2/2015 | Kangas et al. |
| 2016/0066157 A1 | 3/2016 | Noorshams et al. |
| 2016/0309442 A1 | 10/2016 | Lian et al. |
| 2017/0078847 A1 | 3/2017 | Smith et al. |
| 2018/0206168 A1 | 7/2018 | Jia et al. |
| 2020/0033849 A1* | 1/2020 | Yiu .................... G05D 1/0607 |

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.3.0, Sep. 2017, 1-168.

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.3.0, Sep. 2017, 1-78.

3GPP, "3rd Generation Partnership Project; Technical Specification Group Services and System Aspects; Universal Geographical Area Description (GAD) (Release 14)", 3GPP TS 23.032 V14.0.0, Mar. 2017, 1-29.

Unknown, Author, "Addition of a New Positioning Method Based on Additional Sensors Measurements", 3GPP TSG RAN2 Meeting #101, R2-1803452, Ericsson, Sony, Athens, Greece, Feb. 26-Mar. 2, 2018, 15 pages.

Unknown, Author, "Discussion on hybrid positioning including IMU related estimates", 3GPP TSG-RAN WG2 Meeting #98, R2-1704462, Hangzhou, China, May 15-19, 2017, 1-4.

Unknown, Author, "Draft LS on describing acceleration as a universal GAD", 3GPP TSG-RAN WG2 Meeting #99, R2-1709410, Berlin, Germany, Aug. 21-25, 2017, 1-8.

Unknown, Author, "IMU positioning support over LPP", 3GPP TSG-RAN WG2 #98, Tdoc R2-1704743, Hangzhou, P.R. of China, May 15-19, 2017, 1-4.

Unknown, Author, "IMU positioning support over LPP", 3GPP TSG RAN2 Meeting #99, R2-1709409, Berlin, Germany, Aug. 21-25, 2017, 1-5.

Unknown, Author, "IMU sensor based positioning", 3GPP TSG-RAN WG2 Meeting #98, R2-1704750, Hangzhou, P. R. China, May 15-19, 2017, 1-7.

Unknown, Author, "IMU Sensor Based Positioning", 3GPP TSG-RAN2 Meeting #99bis, R2-1711476, Intel Corporation, Ericsson, Sony, Prague, Czech Republic, Oct. 9-13, 2017, 7 pages.

Unknown, Author, "Introduction to IMU for indoor positioning", 3GPP TSG RAN WG2 Meeting #98, R2-1704826, Hangzhou, China, May 15-19, 2017, 1-4.

Unknown, Author, "New WID: UE Positioning Accuracy Enhancements for LTE", 3GPP TSG RAN Meeting #75, RP-170813, Nokia, Alcatel-Lucent Shanghai Bell, Dubrovnik, Croatia, Mar. 6-9, 2017, 4 pages.

Unknown, Author, "Running CR for 36.355 Further Indoor Positioning Enhancements", 3GPP TSG-RAN WG2 #95, R2-165694, NextNav, Göteborg, Sweden, Aug. 22-26, 2016, 15 pages.

* cited by examiner

| Step 100 | The target device optionally obtains a capability request associated to IMU reporting. |

| Step 110 | The target device optionally provides capability info associated to IMU reporting |

| Step 120 | The target device obtains an IMU reporting configuration from a network node |

| Step 130 | The target device obtains IMU measurements and optionally associated measurements, and use the measurements to determine the reporting scope |

| Step 140 | The target device reports IMU measurements according to the determined reporting scope |

Fig. 4a

METHOD AND APPARATUS FOR HANDLING POSITIONING OF A TARGET DEVICE IN A COMMUNICATIONS NETWORK

TECHNICAL FIELD

Embodiments herein relate to positioning of target devices in wireless communication systems, such as cellular networks. In particular the embodiments relate to a target device, a network node and methods performed therein for handling positioning of the target device.

BACKGROUND

User Equipment, UE, positioning, which may also be referred to as target device positioning, is recognized as an important feature for LTE networks due to its potential for massive commercial applications (for example intelligent transportation, entertainment, industry automation, robotics, remote operation, healthcare, smart parking and so on) as well as its relevance to US FCC E911 requirements.

Positioning in LTE is supported by the architecture shown in FIG. 1, where direct interactions between a UE and a location server (E-SMLC) are performed via the LTE Positioning Protocol (LPP). Moreover, there are also interactions between the location server and the eNodeB via the LPPa protocol, to some extent supported by interactions between the eNodeB and the UE via the Radio Resource Control (RRC) protocol.

The following positioning techniques are considered in LTE:
  Enhanced Cell ID. Essentially cell ID information to associate the UE to the serving area of a serving cell, and additional information to determine a finer granularity position.
  Assisted GNSS. GNSS information retrieved by the UE, supported by assistance information provided to the UE from E-SMLC.
  OTDOA (Observed Time Difference of Arrival). The UE estimates the time difference of reference signals from different base stations and sends it to the E-SMLC for multilateration.
  UTDOA (Uplink TDOA). The UE is requested to transmit a specific waveform that is detected by multiple location measurement units (e.g. an eNB) at known positions. These measurements are forwarded to E-SMLC for multilateration.

SUMMARY

It is an object of embodiments herein to enhance performance of a wireless communications network, in particular by improving positioning of a target device.

According to a first aspect of embodiments herein the object is achieved by a method, performed by a target device, for handling positioning of the target device. The target device obtains a sensor reporting configuration from a network node. The target device obtains sensor measurements. The target device determines a reporting scope based on the obtained sensor measurements according to the obtained sensor reporting configuration. The target device sends a measurement report comprising the sensor measurements according to the determined reporting scope to the network node. The measurement report comprises a displacement of the target device relative to a reference position.

According to a second aspect of embodiments herein the object is achieved by a method, performed by a network node, for handling positioning of a target device. The network node sends a sensor reporting configuration to the target device. The network node obtains a measurement report from the target device, comprising sensor measurements according to a reporting scope determined by the target device based on the sent sensor reporting configuration. The measurement report comprises a displacement of the target device relative to a reference position.

According to a third aspect of embodiments herein the object is achieved by a target device, for performing a method for determining a location of the target device. The target device is configured to obtain a sensor reporting configuration from a network node. The target device is configured to obtain sensor measurements. The target device is configured to determine a reporting scope based on the obtained sensor measurements according to the obtained sensor reporting configuration. The target device is configured to send a measurement report to the network node, comprising the sensor measurements according to the determined reporting scope. The measurement report comprises a displacement of the target device relative to a reference position.

According to a fourth aspect of embodiments herein the object is achieved by a network node, for performing a method for determining a location of a target device. The network node is configured to send a sensor reporting configuration to the target device. The network node is configured to obtain a measurement report from the target device, comprising sensor measurements according to a reporting scope determined by the target device based on the sent sensor reporting configuration. The measurement report comprises a displacement of the target device relative to a reference position.

According to a fifth aspect of embodiments herein the object is achieved by a computer program product comprising instructions, which, when executed on at least one processor, cause the at least one processor to carry out the methods according to the embodiments herein.

According to a sixth aspect of embodiments herein the object is achieved by a computer-readable storage medium, having stored thereon a computer program product comprising instructions which, when executed on at least one processor, cause the at least one processor to carry out the methods according to the embodiments herein.

Since the target device determines the reporting scope based on the obtained sensor measurements and the obtained sensor reporting configuration, the sensor measurement reporting scope, such as e.g. an IMU measurement reporting scope, may be adapted to the movements of the target device. Thereby, the target device is able to provide more detailed information in very mobile scenarios, such as e.g. when the target device moves heavily, and less detailed information when the target device is not moving or moving in a less complex manner. Thereby the positioning of the target device can be improved while reducing the amount of data transmitted over the communications network, which may increase the capacity of the communications network.

Another advantage is that by reporting the sensor measurements the network is able to perform positioning based on this assisted information from the target device, such as e.g. a UE. There may further be other parameters such as for example OTDOA assistance data which may be modified by knowing more precise information from the mobility behavior of the UE.

Definitions

| Abbreviation | Explanation |
| --- | --- |
| A-GNSS | Assisted-GNSS |
| E-CID | Enhanced Cell Identity |
| GNSS | Global Navigation Satellite System |
| IMU | Inertial Measurement Unit |
| OTDOA | Observed Time Difference of Arrival |

BRIEF DESCRIPTION OF THE DRAWINGS (OPTIONAL)

Figure 2:
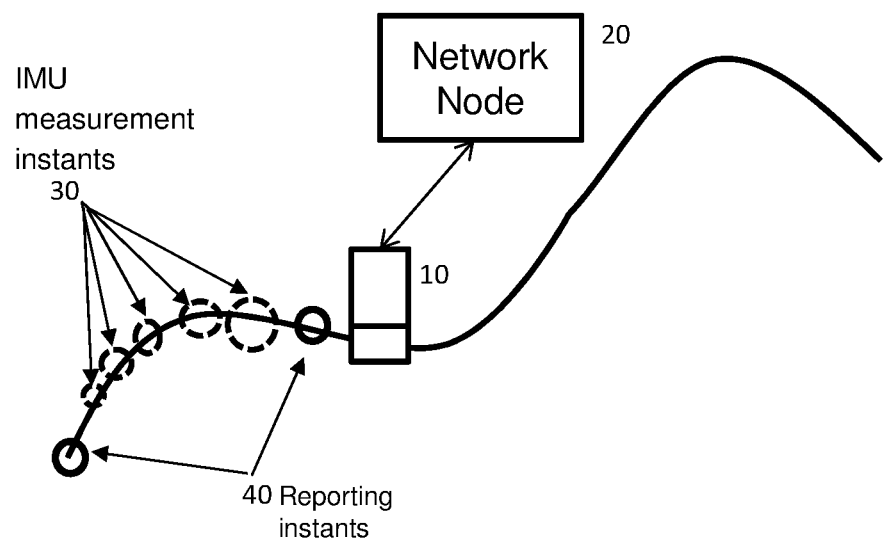
Figure 3:
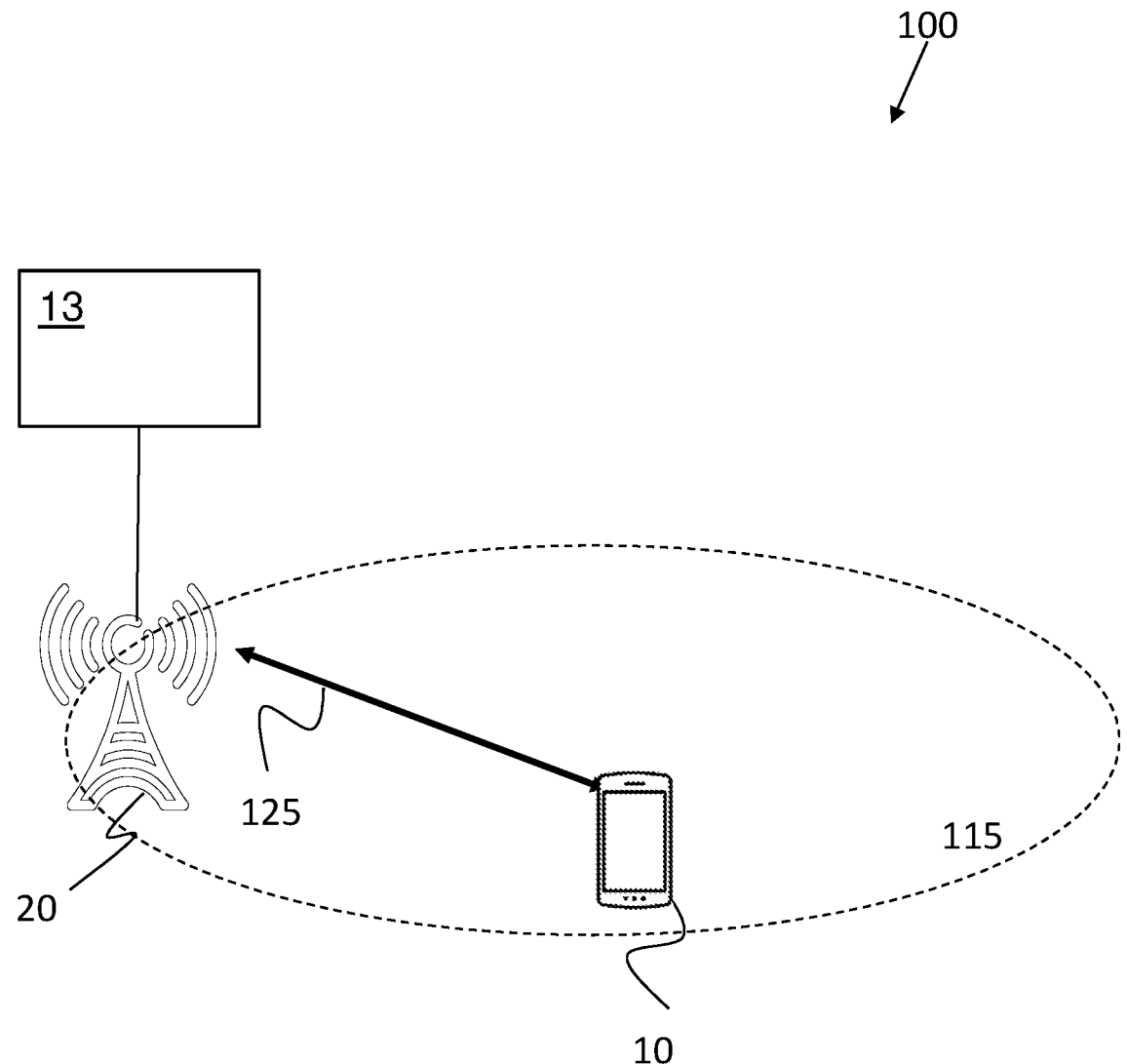
Figure 4B:
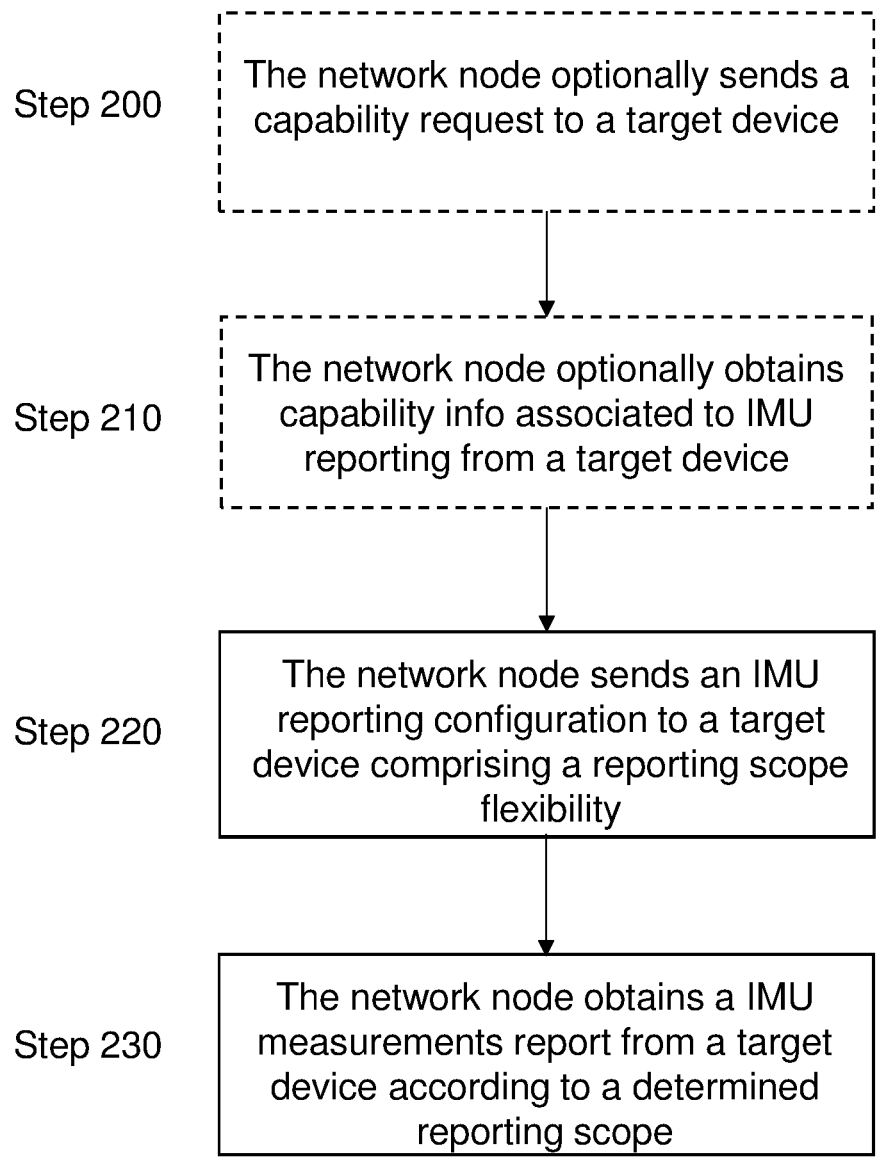
Figure 5:
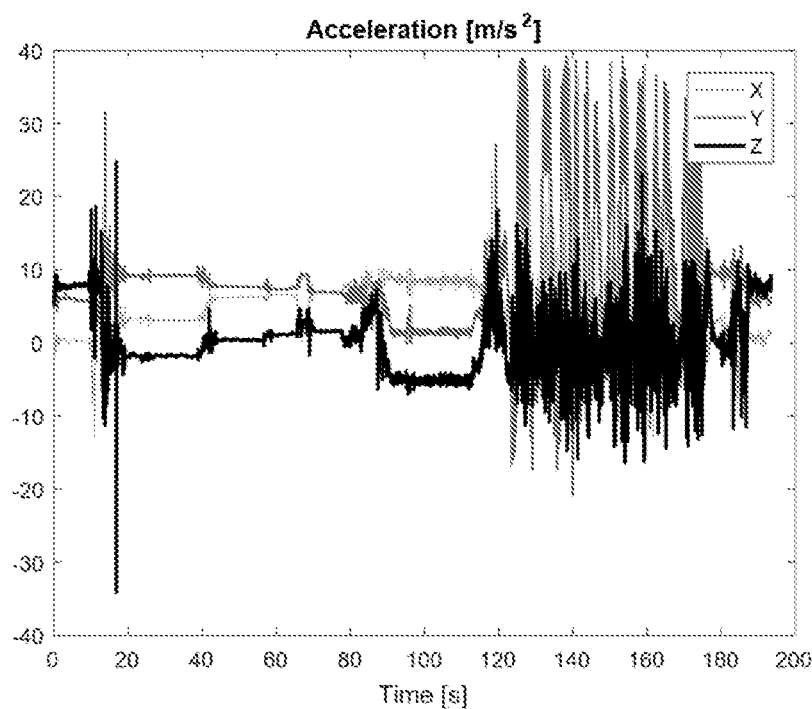
Figure 6:
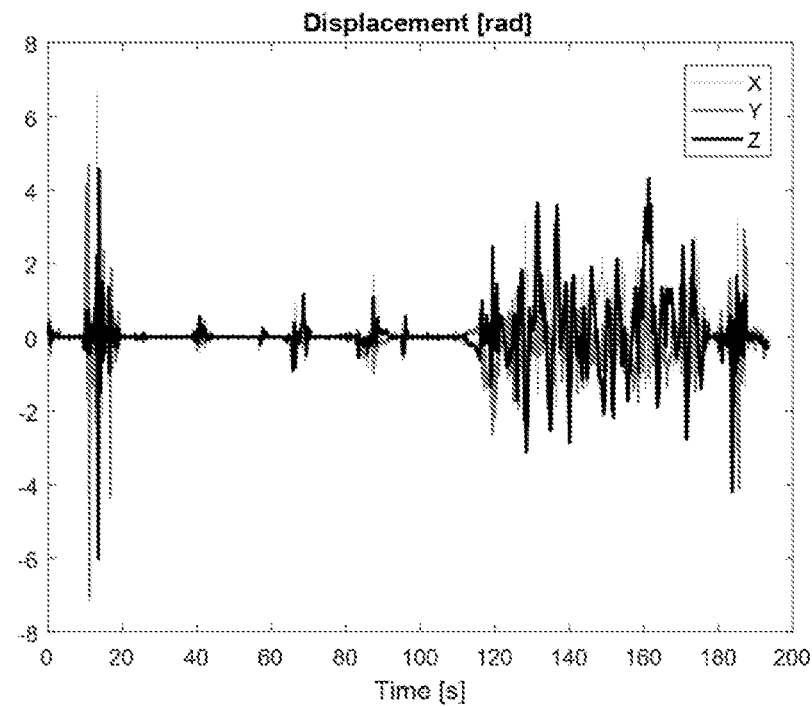
Figure 7:
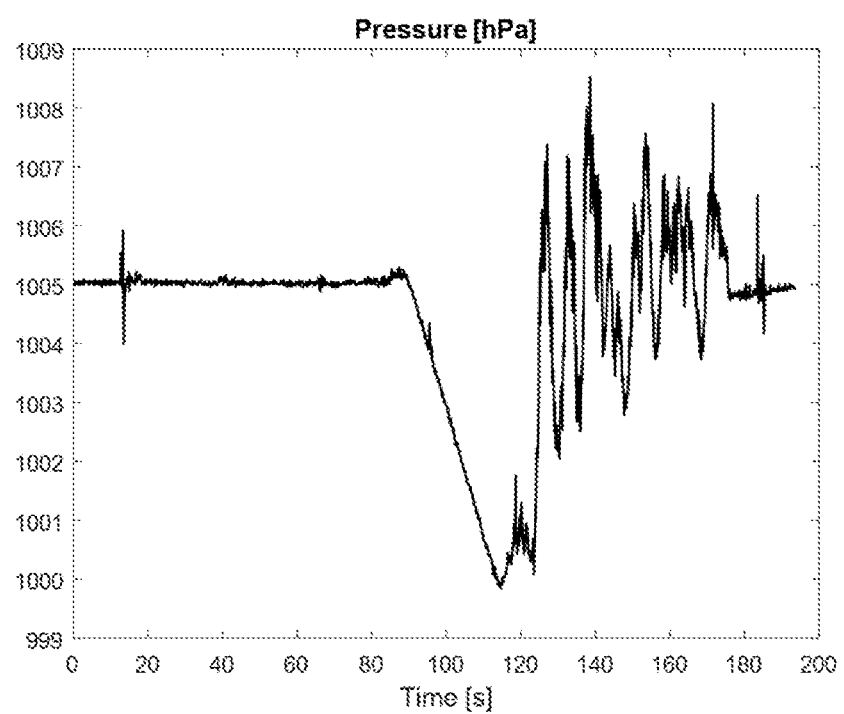
Figure 8:
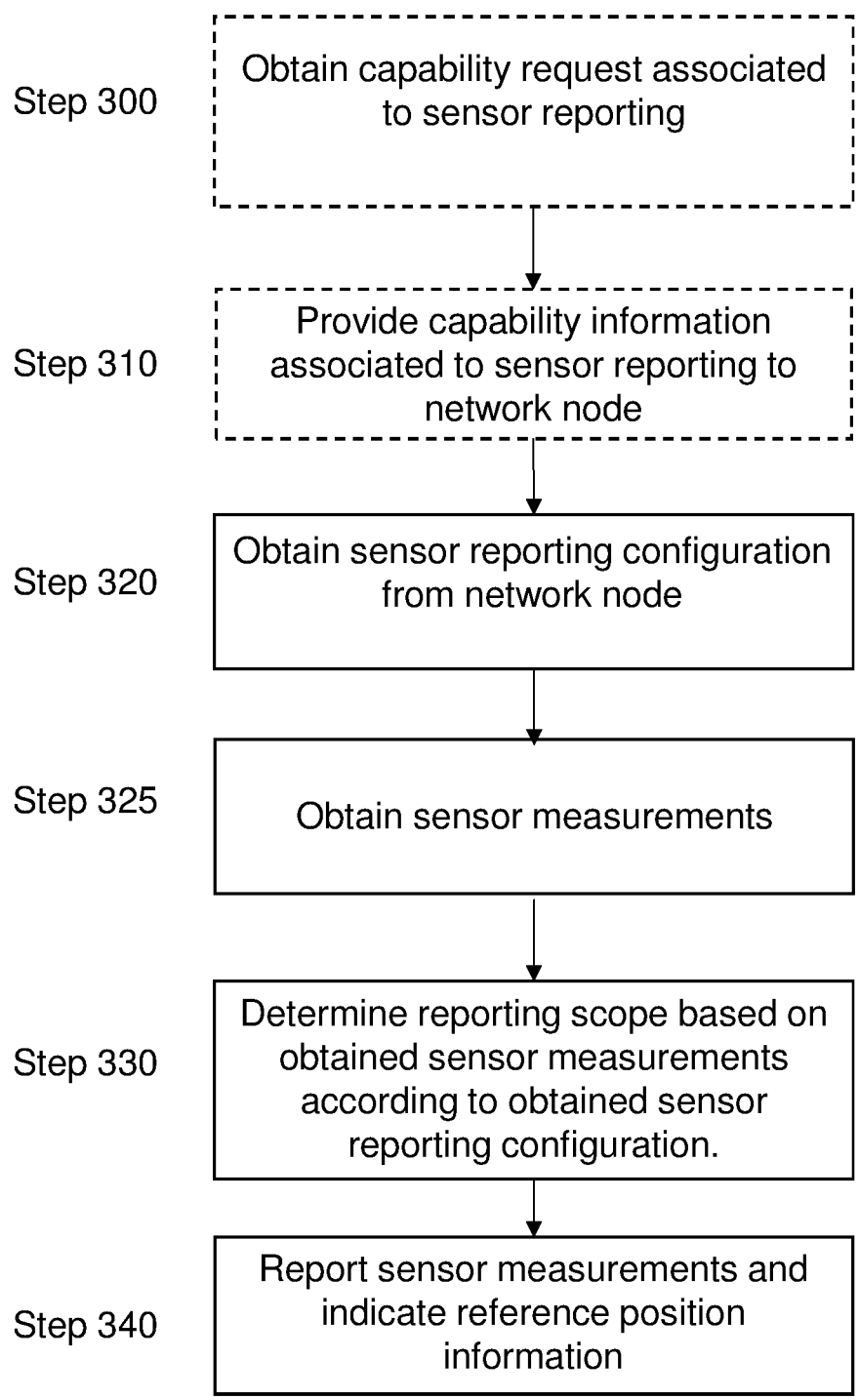
Figure 9:
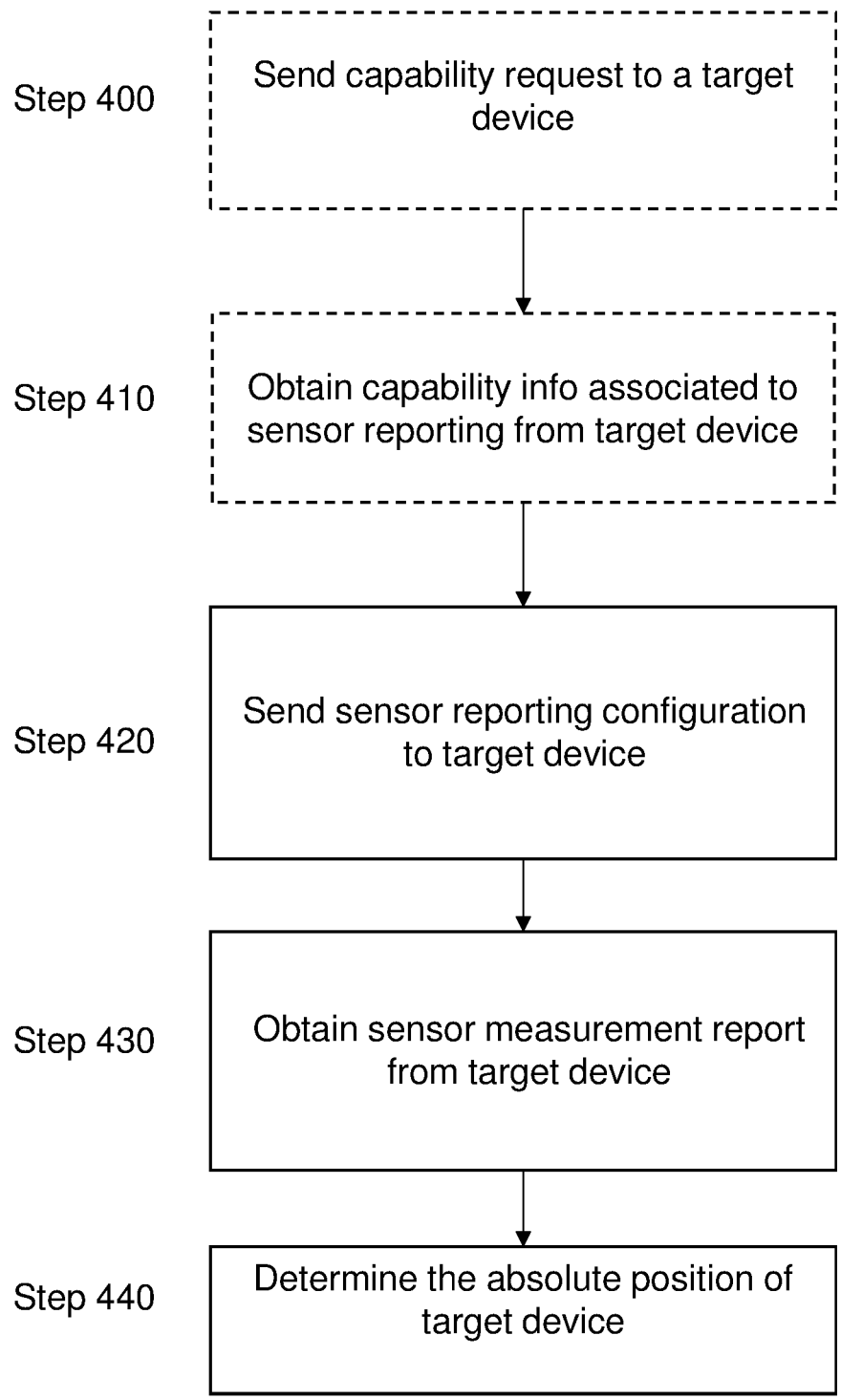
Figure 10:
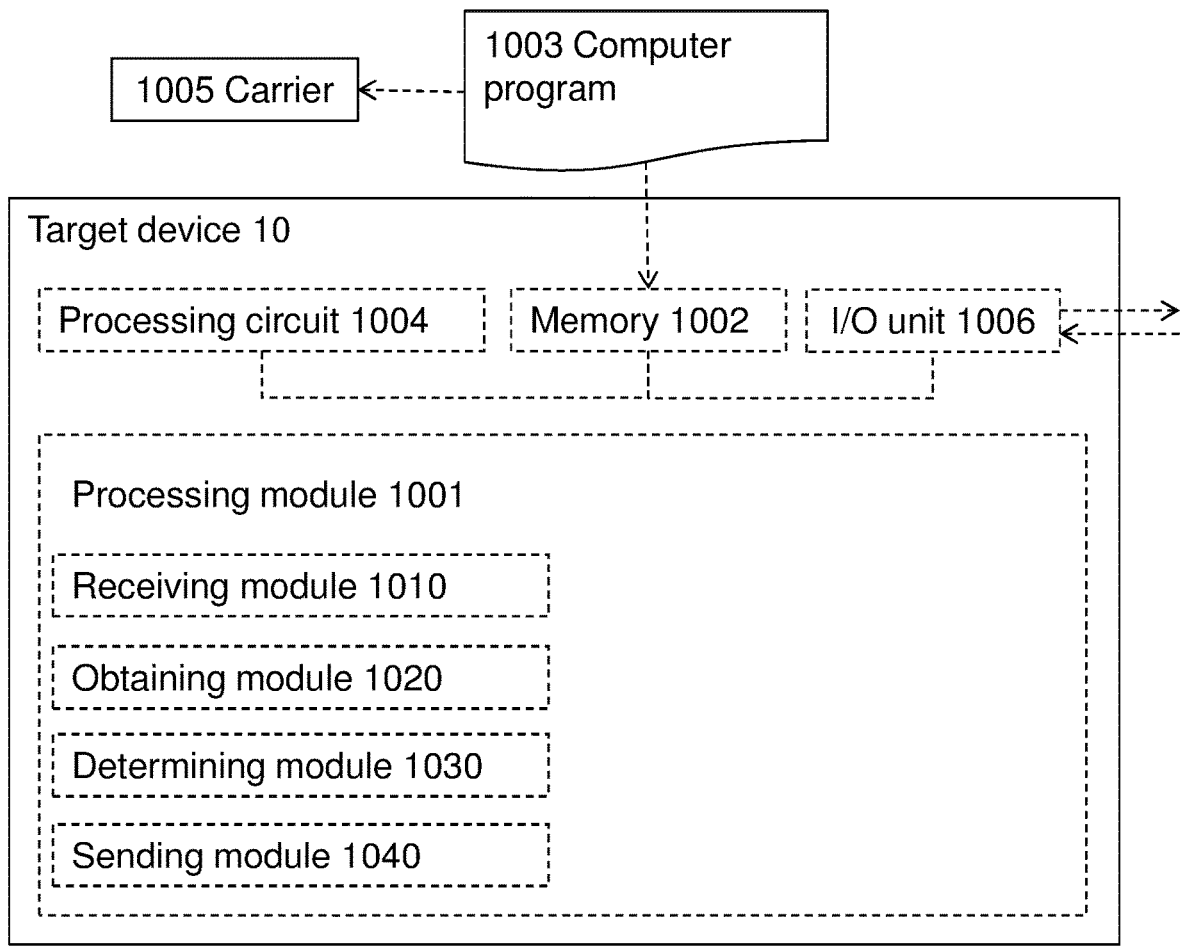
Figure 11:
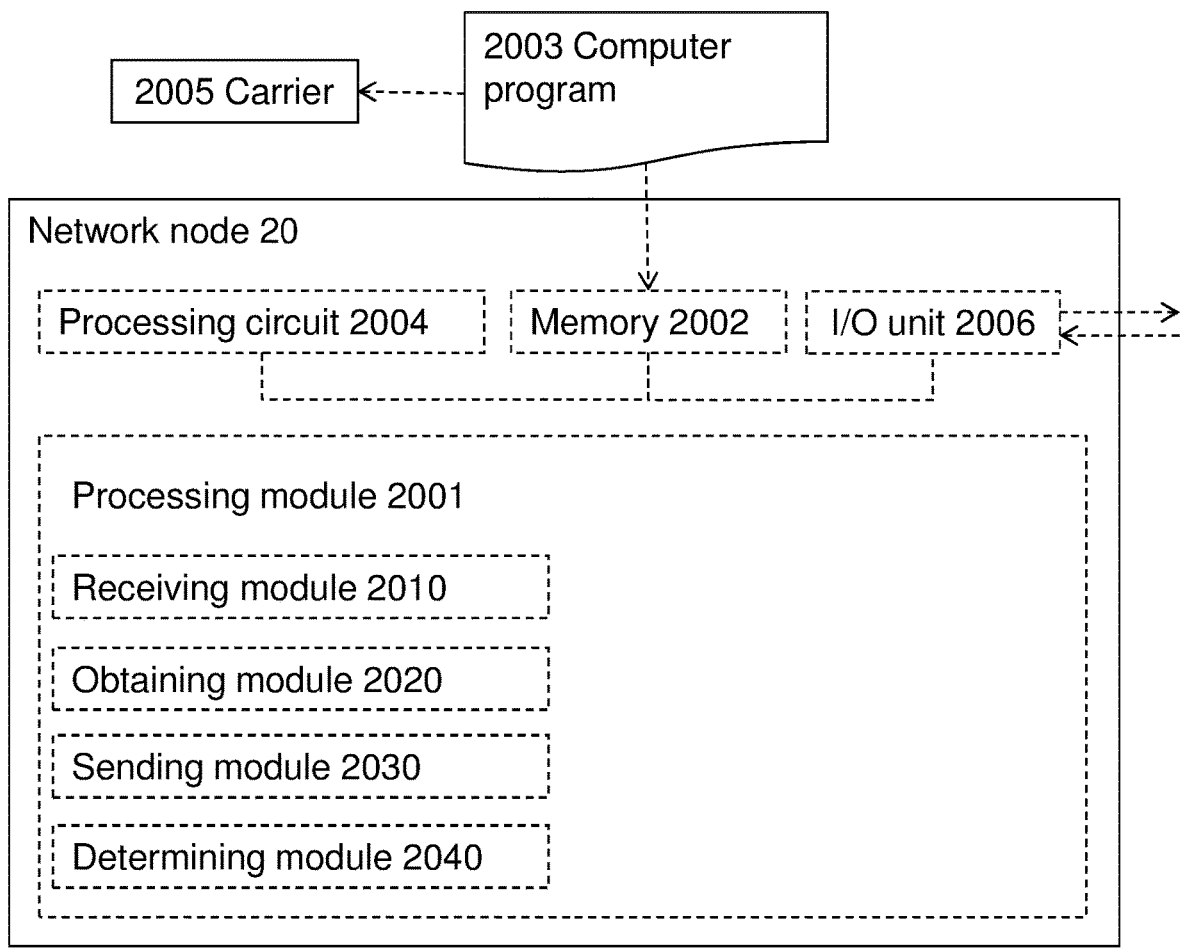

FIG. 1 is a schematic block diagram illustrating an LTE positioning architecture, FIG. 2 is a schematic block diagram illustrating an example measurement of time series, FIG. 3 is a schematic block diagram illustrating embodiments of a wireless communications network;

FIG. 4a is a flowchart depicting a first embodiment of a method performed by a target device, FIG. 4b is a flowchart depicting a first embodiment of a method performed by a network node, FIG. 5 is a diagram depicting a measurement example using an accelerometer, FIG. 6 is a diagram depicting a measurement example using a gyroscope, FIG. 7 is a diagram depicting a measurement example using a barometer, FIG. 8 is a flowchart depicting a second embodiment of a method performed by a target device, FIG. 9 is a flowchart depicting a second embodiment of a method performed by a network node, FIG. 10 is a schematic block diagram illustrating some first embodiments of a target device, FIG. 11 is a schematic block diagram illustrating some first embodiments of a network node.

DETAILED DESCRIPTION

The embodiments herein relate to the target device, the network node and methods performed therein for handling positioning of the target device. The target device obtains a sensor reporting configuration from the network node and further obtains sensor measurements relating to the target device. Based on the obtained sensor measurements and the obtained sensor reporting configuration the target device determines a reporting scope that may be used by the network node to determine the position of the target device. The target device sends a measurement report to the network node, comprising the sensor measurements according to the determined reporting scope, wherein the measurement report comprises a displacement of the target device relative to a reference position. The information comprised in the measurement report may then be used by the network node to determine an absolute position of the target device.

FIG. 3 illustrates a communication scenario in an example wireless communication network, where at least some of the embodiments herein may be used. The wireless communication network 100 comprises one or more target devices 10. The target devices 10 may e.g. be UEs, mobile phones, smart phones, laptop computers, tablet computers, Machine-Type Communication (MTC) devices, mobile stations, stations (STA), or any other devices that can provide wireless communication and thus may also be referred to as a wireless device. The target device 10 may communicate via the wireless communication network, such as a Local Area Network (LAN), such as e.g. a Wi-Fi network, or a Radio Access Network (RAN) to one or more core networks (CN) 13 such as e.g. an Evolved Packet Core (EPC) or a 5th Generation Core (5GC). The wireless communication network 100 further comprises a network node 20, such as e.g. a radio access node e.g., a Wi-Fi access point or a radio base station (RBS), which in some networks may also be denoted, for example, a NodeB, eNodeB (eNB), or gNodeB (gNB) as denoted in New Radio (NR). NR may also be referred to as 5th-Generation Wireless Systems (5G). The network node 20 serves a coverage area 115, which may also be referred to as e.g. a cell, a beam or a beam group.

Inertial Measurement Units (IMUs) have been deployed in smartphones for some time to provide measurement data. Such data may be used to support positioning and orienteering of the device together with other measurements such as GNSS, magnetometer, barometer etc. Recently, there are also interest in specifying means to configure and report IMU measurements to a location server. The location server may be comprised in the network node 20.

The IMU in target devices may be based on multiple axes accelerometer and gyro, typically three axes each. The IMU may furthermore typically be integrated in the device such that these axes are aligned with the device geometry, like two axes aligned with the horizontal plane when the phone is lying flat, and one axis in a direction upwards perpendicular to the two other axes.

There are obvious benefits of using IMUs for UE-based positioning, where the target device may fuse IMU measurements with other measurements for refined positioning. The term fuse shall herein be interpreted as combining the measurements. It may also be possible to use IMUs for UE assisted positioning, where the target device reports IMU measurements to a network node. The embodiments herein may be used to achieve flexible IMU reporting.

When configuring IMU measurements and reports it may not be obvious what to measure, that would be representative for a time period and that may be relevant for a location server to which the measurements are reported. Compared to a UE-based solution, the UE-assisted solution implies delayed measurements and also the need to condense the observations to compressed reports, whereas a UE-based solution can benefit from raw measurement data with high time updates. Furthermore, IMU measurements cannot alone provide an absolute position.

The embodiments herein may be used to achieve a flexible measurement reporting scope, such as an IMU measurement reporting scope, where a target device adapts the report content based on actual measurements, both IMU measurements and associated measurements. An example scenario is illustrated in FIG. 2, in which a target device 10, such as e.g. a UE, is associated to a network node 20, and where the target device 10 may make one or more measurements, such as IMU measurements, at measurement instants 30 occurring within a time window, and the target device 10 may be requested to report measurement information, such as IMU information, at reporting instants 40. In the following, target device and UE may be used interchangeably.

Some example steps that may be performed by a target device are illustrated by FIG. 4a.

Step 100: The target device 10 may obtain a capability request associated to measurement reporting, such as IMU reporting. The request may e.g. be obtained from the network node 20.

This step 100 corresponds to step 300 discussed below in regards to FIG. 8.

Step 110: The target device 10 may provide its capability information associated to measurement reporting, such as IMU reporting. The capability information may e.g. comprise information on which sensors the target device 10 has available for performing measurements, which measurements that can be performed by the target device 10 and which information that may be provided by the target device 10 based on the available sensors and the measurements that can be performed by the target device 10.

This Step 110 corresponds to Step 310 discussed in regards to FIG. 8.

Step 120: The target device 10 obtains a measurement report configuration, such as e.g. an IMU report configuration, from a network node 20, enabling a flexible measurement reporting, such as an IMU reporting. Thereby the target device 10 may adapt the reporting scope, which may also be referred to as the measurements that are reported, to the movements of the target device. The target device 10 may report more detailed information in highly mobile scenarios, such as e.g. when the target device moves to a great extent, and less detailed information when the target device is not moving or moving in a less complex manner.

This Step 120 corresponds to Step 320 discussed in regards to FIG. 8.

Step 130: Based on the obtained measurement report configuration, the target device 10 uses measurements, such as e.g. IMU and/or other associated measurements, to determine a suitable reporting scope.

Examples of ways of determining the reporting scope comprise (to be explained in more detail below):
  Selecting one or more time segments within which the IMU measurements may be described by model parameters. For example, the IMU measurements may be constant or linear over a time segment.
  The selection of time segments may be based on an analysis of the gyro or magnetometer measurements to identify time segments when the device has had a constant orienteering.
  The selection of time segments may be based on an analysis of the barometer measurements to identify time segments when the device has had a constant altitude. If the measurements of a time segment is considered noisy and/or uncertain, the target device may instead characterize the statistical properties of the IMU measurements of the time segment.

This Step 130 is similar to Step 325 and 330 discussed in regards to FIG. 8.

Step 140: Based on the determined reporting scope, the target device compiles a measurement report and sends the report to the network node 20. The measurement report comprises the sensor measurements according to the determined reporting scope. This Step 140 is similar to Step 340 discussed in regards to FIG. 8.

Some example steps that may be performed by the network node 20 are illustrated by FIG. 4b.

Step 200: The network node 20 may optionally send a capability request to the target device 10. This Step 200 corresponds to Step 400 as discussed in regards to FIG. 9.

Step 210: The network node 20 obtains the capabilities associated to IMU measurements and/or reporting from the target device 10. This Step 210 corresponds to Step 410 as discussed in regards to FIG. 9.

Step 220: The network node 20 provides the target device 10 with a measurement report configuration, such as an IMU report configuration, enabling a flexible measurement reporting scope. The IMU reporting configuration may be sent to the target device 10 and may comprise a reporting scope flexibility. This Step 220 corresponds to Step 420 as discussed in regards to FIG. 9.

Step 230: The network node 20 obtains an IMU measurement report following a specific reporting scope. The specific reporting scope may be the reporting scope determined by the target device 10. This Step 230 corresponds to Step 430 as discussed in regards to FIG. 9.

In another aspect of the embodiments herein, the sensor measurements, such as e.g. IMU measurements, may not be capable of providing an absolute position but a relative position. In one embodiment, the target device 10 indicates a reference position to which the relative positioning measurements and estimates relates. This may also comprise other sensors such as magnetometer and light sensors and associated measurements. This may also comprise the barometric sensor.

The embodiments herein enables adaption of the IMU measurement reporting scope to the movements of the target device 10. Thereby, it is an advantage that the target device 10 is able to provide more detailed information in scenarios with high mobility, and less detailed information when the device is not moving or moving in a less complex manner.

Another advantage is the fact that by reporting the IMU measurements the network is able to perform positioning of the target device 10 based on these assisted information from the target device 10. There may be other parameters such as for example the OTDOA assistance data which may be modified by knowing more precise information from the mobility behavior of the target device 10.

Another advantage of employing the reference position as described herein is that it enables the target device 10 to inform the location server about the reference position the sensor measurements relates to.

FIG. 5-7 illustrates IMU measurements in a specific scenario to exemplify such data. The data in this example has been collected during a roller-coaster ride with Wildfire at Kolmården, Sweden. FIG. 5 illustrates the 3-axis accelerometer measurements, FIG. 6 illustrates the 3-axis gyro measurements, and FIG. 7 the barometric pressure measurements. After about 90 seconds, a car starts the ascent up to the top, and after a distinct descent, the ride continues with acceleration in varying directions, and in the end, the car is subject to a 1G braking force.

From these measurements, it is possible to make the following observations:
  There are several time segments, where the acceleration and gyro measurements are constant or linear.
  The time segments may be identified based on the accelerometer data itself, but also gyro data and barometer may be used to identify separate time segments
  Magnetometer measurements was not recorded, but may also be used to identify separate time segments.
  In time segments where the IMU measurements are not constant nor linear, IMU measurement statistics may be relevant to represent the IMU measurements of a time segment. For example the accelerometer magnitude statistics (or statistics per axis) may be used to characterize vibration that the device has been subject to.

The orientation of the device, such as the target device 10, may be estimated using the accelerometer and the magnetometer. The accelerometer gives the device's acceleration in X, Y, and Z coordinates (in respect to a coordinate system of the device). Since the accelerometer measures gravity as acceleration, an estimate of the z-component (in earth-bounded coordinates) may be extracted using the accelerometer. The earth-bounded x/y-orientation may be estimated using the magnetometer, where the magnetometer's measurements are based on the magnetic field of the earth.

One of the parameters which may be clarified in the reporting of the IMU measurements, is the orientation of the target device 10 at the initial measurement point. The initial measurement point may be the reference position in relation to which the relative measurements are performed. As the next measurements, which may also be referred to as following measurements, provide the relative movements it would be possible for the network to continue estimating the orientation of the target device 10 at later steps while it should be reported in the initial measurement reporting.

Therefore, in one embodiment, the target device 10 transforms the sensor measurements into an earth-bounded coordinate system.

In another embodiment, the target device 10 combines the sensor measurements into an estimated displacement relative a reference position, where both the reference position and the displacement may be expressed in an earth-bounded coordinate system.

In another embodiment, the target device 10 expresses the measurements in a UE-bounded coordinate system, but includes information about how the target device-bounded and earth-bounded coordinate systems are related. For example, the relation may be expressed via a rotation matrix in 3D.

As is obvious from the examples shown in FIGS. 5-7, it may not be practical to receive all the IMU measurements done at the target device side. On the other hand, having a fixed periodical time reporting may also not be an efficient approach, as the fixed timing may be short or long at different times due to target device behavior. It may be useful to employ a specific time segmentation for IMU reporting based on some sudden changes in the target device behavior. Thus, the target device 10 may apply specific time segmentation for the IMU reporting based on changes in the behavior of the target device In one embodiment, these time segment separations may be identified by the target device 10 by thresholding the measurements for each sensor or a specific sensor.

In another embodiment, these time segment separations may be identified by the target device by taking the derivative of the measurement curves for each sensor. In case the absolute derivative is above a threshold in one time instant, then this point may define a divider between time segments.

In general, the identified time segmentation instants may occur when one or more sensors fulfil a time segmentation criteria. Where the time segmentation criteria may be based on the device sensor sensitivity, where a high sensitive (accurate) device needs less change (e.g. lower absolute derivative) in comparison to a less sensitive device.

In another embodiment, the target device 10 may be configured with the time segmentation criteria. The criteria may involve a sensor specific threshold as described above or some predefined more complex criteria. The time segments may also be subject to a maximum/minimum time duration of time segments.

It is common to observe changes in one or more sensors but not all of them, for example the constant behavior in the barometer sensor data may be observed as shown in FIG. 7, while there are more changes in data from the other two sensors. In one embodiment, the target device 10 may be configured to refrain from reporting data for a sensor if the data is the same as the previous time segment. Optionally, the target device 10 may indicate that it has refrained from reporting due to the data being the same as the previous time segment.

In case of noisy IMU measurements, for example when the triggering criteria is fulfilled constantly during a short time period (seen in FIG. 6 after ~10 seconds), the time segments may be too short which indicates that no reliable IMU data may be gathered from that time period. The target device 10 may then report a combined time segment comprising the time duration when the IMU is too noisy, and for that time segment indicate that no reliable IMU data may be gathered. In one embodiment, the target device 10 may also report the statistical properties of the IMU data in that time segment. This may for example include the distribution of the sensor magnitudes, such as for example the distribution of the gyroscope yaw-magnitudes within said time segment. Other statistical properties of the IMU data may comprise:
  the maximum value of the time segment,
  the amount of time or fraction of a time segment which the sensor data has been exceeding a threshold.
  Frequency domain information about the time segment, such as information obtained via a transformation from time to frequency domain, e.g. via a Fourier transform. Energy in the frequency spectrum may indicate the vibration that the target device 10 has been subject to during the time segment.

The IMU data for each time segment may include an averaged value of the considered IMU. Or it may be a filtered value, for example by first applying a low-pass filter to get rid of high noise peaks, and then apply averaging of the filtered values.

In one embodiment, the target device 10 may report the new IMU data based on the difference, which may also be referred to as the relative value, from the previous value reported, or in another embodiment, at any time instant that reporting is triggered the corresponding IMU sensor data value may be reported.

As the network would not have a complete curve of each of these IMU measurement data, the target device 10 may send the uncertainty factor of the measurements to the network. For example, as it may be seen at the end of the curves shown in FIGS. 5-7, when the fluctuations of the data is very high, then at the time that the network has received the measurement data, the validity of it is already passed.

The network, such as the network node 20, may provide the target device 10 with the threshold on which uncertainty is considered so high that it is best to not have any reporting until the target device 10 reaches a more stable condition, in order to avoid useless measurement reporting.

The IMU data may be reported in an earth-bounded coordinate system. Or in another embodiment, in a coordinate system of the target device 10, where for example the z-component may be the component with direction out of the display.

The sensor measurements, such as e.g. IMU measurements, magnetometer measurements light sensor measurements, and/or barometer measurements, provide relative position information, which requires an absolute reference position to relate to in order to enable an estimation of the absolute position at the location server or at the target device 10. The location server may be comprised in the network node 20.

In one embodiment, the network node 20, and/or the location server comprised in the network node 20, may send an absolute reference position to the target device 10.

In another embodiment, the network node 20 and/or location server may send absolute reference position information in terms of a time instant, and the target device 10 may determine the relative position to its position at this time instant. The time instant may be explicit or implicit, such as the time of the most recent positioning report from the target device 10.

In one embodiment, the target device may determine the reference position. In one alternative, the reference position may be an estimated absolute position at a previous time instant. In another alternative, the reference position determined by the target device 10 may be an artificial position used to encode a relative position by stating another absolute position, where the difference between the two gives the relative position.

To enable the target device 10 reporting of an absolute position relative to a reference absolute position, 3GPP TS 36.355 may be extended with a field denoted Sensor-MeasurementInformation-r15. The signaling in ASN1 may for example be according to:

```
-- ASN1START
Sensor-MeasurementInformation-r15 ::= SEQUENCE {
    measurementReferenceTime-r15 UTCTime          OPTIONAL,
    IMU-position-point    LocationCoordinates     OPTIONAL,
}
-- ASN1STOP
```

In the above signaling, the target device 10 provides a sequence of measurements, were the first element in the sequence may indicate the starting time of sensor measurements, e.g. using UTCTime format, together with an absolute reference position (denoted IMU-position-point), the other elements in the sequence indicate the time and the relative displacement in relation to the IMU-position-point. Note that the LocationCoordinates is an absolute positon, defined in 3GPP TS 36.355.

In one embodiment, the target device 10 may determine a reference position in terms of a time instant. The time instant may be implicitly given as the time instant of the most recent positioning report from the target device 10. The time instant may also correspond to a specific positioning report but to the most recent. One example is the most recent report that either comprises an absolute position estimate or enough information to determine an absolute position. An example of the latter is a positioning report comprising received signal time difference measurements that the network node 20 and/or location server may use to estimate an absolute position.

FIGS. 8 and 9 illustrate the steps of the reference position handling from the target device 10 and network node 20 perspective respectively.

FIG. 8 illustrates some method steps associated to reference position handling that a target device may perform. Dashed lines in the figure indicate that these boxes are optional.

Step 300: The target device 10 may obtain a capability request associated to sensor reporting. This Step 200 corresponds to Step 100 as discussed in regards to FIG. 4a.

Step 310: The target device 10 may provide capability information to the network node 20. The capability information may e.g. comprise information regarding which sensors the target device 10 has available, such as e.g. which type of sensors are comprised in the target device 10, and which measurements the target device 10 may perform with the available sensors.

Step 320: The target device 10 obtains a sensor reporting configuration from the network node 20. The sensor reporting configuration may be selected for determining the location, which may also be referred to as the absolute position, of the target device 10.

The sensor reporting configuration may comprise reference position information, such as e.g. the reference position of the target device. The reference position may be used as a starting position from which the relative displacement of the target device shall be measured.

The sensor reporting configuration may e.g. comprise the type of sensors that shall be used for performing the measurements or which type of measurements that shall be performed.

Step 325: The target device 10 obtains sensor measurements. The sensor measurements may relate to a movement of the target device 10, such as e.g. a displacement, an orientation or a change of pressure related to the target device 10. The target device 10 may determine a relative position relative to a reference position, e.g. by combining a plurality of sensor measurements to determine the relative position. The sensor measurements may comprise IMU measurements, such as e.g. accelerometer measurements, gyro measurements, barometric pressure measurements.

The sensor measurements may comprise the reference position of the target device at an initial measurement point, such as an initial measurement position. The initial measurement position may be an absolute position of the target device 10 at the beginning of the measurement. When the target device 10 starts the sensor measurements it may determine its absolute position. The following sensor measurements may measure a deviation, such as a relative movement, of the target device from the initial measurement position.

The sensor measurements may further comprise the orientation of the target device at the reference position.

This Step 325 is similar to Step 130 as discussed in regards to FIG. 4a.

Step 330: The target device 10 determines a reporting scope based on the obtained sensor measurements according to the obtained sensor reporting configuration. Determining the reporting scope may e.g. comprise determining which of the obtained measurements that shall be reported to the network node 20 based on the obtained sensor reporting configuration. Thereby the target device 10 may adapt the reporting scope, which may also be referred to as the measurements that are reported, to the movements of the target device 10. The target device 10 may report more detailed information in very mobile scenarios, such as e.g. when the target device moves heavily, and less detailed information when the target device is not moving or moving in a less complex manner.

This Step 330 is similar to Step 130 as discussed in regards to FIG. 4a.

Step 340: The target device 10 reports the sensor measurements and indicates the reference position information, according to the determined reporting scope. Reporting the sensor measurements may comprise sending a measurement report comprising the sensor measurements to the network node 20.

The reference position information may be implicit, to indicate the reference position obtained from the network node, or may comprise a time instant that may be associated to a reference position. One example of a time may be the time, such as a time instant, associated to a positioning report in the past. Another example may be a target device 10 that indicates a reference position and a current position as a means to encode a relative position.

This Step 340 corresponds to Step 140 as discussed in regards to FIG. 4a.

FIG. 9 shows the method steps according to embodiments herein associated to reference position handling from a network node perspective. Dashed lines in the figure indicate that these boxes are optional.

Step 400: The network node 20 may send a capability request to the target device 10. This Step 400 corresponds to Step 200 as discussed in regards to FIG. 4b.

Step 410: The network node 20 may obtain capability information associated to sensor reporting from the target device 10.

This Step 410 corresponds to Step 210 as discussed in regards to FIG. 4b.

Step 420: The network node 20 sends the sensor reporting configuration to the target device 10. The sensor reporting configuration may comprise a reference position information. The reference position information may indicate the reference position to be used when indicating the relative position of the target device 10. The reference position may be explicit, or implicit. An example of the latter may be an indication to use a position associated to a specific time instant. For example, this may be the time instant of the most recent positioning report if nothing else is stated. Hence, the position of the target device 10 at the time instant of the most recent positioning report may be indicated in the reference position information as the reference position. The sensor measurements may comprise IMU measurements, such as accelerometer measurements, gyro measurements and/or barometric pressure measurements. The reported sensor measurements may comprise a reference position of the target device 10.

The reported sensor measurements may further comprise the orientation of the target device 10 at the reference position.

This Step 420 corresponds to Step 220 as discussed in regards to FIG. 4b.

Step 430: The network node 20 obtains the sensor measurement report from the target device 10 comprising reference position information.

This Step 430 corresponds to Step 230 as discussed in regards to FIG. 4b.

Step 440: The network node 20 determines the absolute position of the target device 10 based on the obtained sensor measurements. Alternatively, the network node 20 obtains a positioning estimate from the target device 10 based on a previously signalled reference position and the relative position determined by the target device 10.

With reference to FIG. 10, a schematic block diagram of embodiments of the target device 10 of FIG. 2 is shown. Dashed lines in the figure indicate that these boxes are optional.

The target device 10 may comprise a processing module 1001, which could be used as a means for performing the methods described herein. The means may be embodied in the form of one or more hardware modules and/or one or more software modules The target device 10 may further comprise a memory 1002. The memory may comprise, such as contain or store, instructions, e.g. in the form of a computer program 1003, which may comprise computer readable code units.

According to some embodiments herein, the target device 10 and/or the processing module 1001 may comprise a processing circuit 1004 as an exemplifying hardware module. Accordingly, the processing module 1001 may be embodied in the form of, or 'realized by', the processing circuit 1004. The instructions may be executable by the processing circuit 1004, whereby the target device 10 may be operative to perform the methods of FIG. 4a and/or FIG. 8. As another example, the instructions, when executed by the target device 10 and/or the processing circuit 1004, may cause the target device 10 to perform the method according to FIG. 4a and/or FIG. 8.

In view of the above, in one example, there is provided a target device 10 for performing a method for positioning the target device. As mentioned, the target device 10 may be configured to perform the method steps disclosed in FIGS. 4a and 8.

Again, the memory 1002 may contain the instructions executable by said processing circuit 1004 whereby the target device 10 may be operative for:
  obtaining, from a network node 20, a sensor reporting configuration,
  determining a reporting scope based on obtained sensor measurements according to the obtained sensor configuration,
  sending, to the network node 20, a measurement report for the sensor measurements according to the determined reporting scope.

The memory 1002 may contain the instructions executable by said processing circuit 1004 whereby the target device 10 may be operative for:
  obtaining, from the network node 20, a capability request associated to sensor reporting,
  providing, to the network node 20, capability information associated to sensor reporting.

FIG. 10 further illustrates a carrier 1005, or program carrier, which comprises the computer program 1003 as described directly above.

In some embodiments, the processing module 1001 comprises an Input/Output module 1006, which may be exemplified by a receiving module and/or a sending module as described below when applicable.

In further embodiments, the target device 10 and/or the processing module 1001 may comprise one or more of a receiving module 1010, an obtaining module 1020, a determining module 1030, and a sending module 1040 as exemplifying hardware modules. In other examples, one or more of the aforementioned exemplifying hardware modules may be implemented as one or more software modules.

Accordingly, the target device 10 may be configured to obtain, from the network node 20, a sensor reporting configuration.

Therefore, according to the various embodiments described above, the target device 10 and/or the processing module 1001 and/or the obtaining module 1020 and/or the receiving module 1010 may be configured to obtain a sensor reporting configuration.

The target device 10 is further configured to obtain sensor measurements prior to determining the reporting scope.

Therefore, according to the various embodiments described above, the target device 10 and/or the processing module 1001 and/or the obtaining module 1020 may be configured to obtain sensor measurements prior to determining the reporting scope.

Furthermore, the target device 10 may be configured to determine a reporting scope based on obtained sensor measurements according to the obtained sensor configuration.

Therefore, according to the various embodiments described above, the target device 10 and/or the processing module 1001 and/or the determining module 1030 may be configured to determining a reporting scope based on obtained sensor measurements according to the obtained sensor configuration.

The target device 10 may further be configured to send, to the network node 20, the measurement report for the sensor measurements according to the determined reporting scope, wherein the measurement report comprises a displacement of the target device (10) relative to a reference position.

Therefore, according to the various embodiments described above, the target device 10 and/or the processing module 1001 and/or the sending module 1040 may be configured to send the measurement report for the sensor measurements to the network node 20 according to the determined reporting scope, wherein the measurement report comprises a displacement of the target device (10) relative to a reference position.

The target device 10 may further be configured to obtain the capability request associated to sensor reporting from the network node 20.

Therefore, according to the various embodiments described above, the target device 10 and/or the processing module 1001 and/or the obtaining module 1020 may be configured to obtain the capability request associated to sensor reporting.

The target device 10 may further be configured to provide, to the network node 20, capability information associated to sensor reporting.

Therefore, according to the various embodiments described above, the target device 10 and/or the processing module 1001 and/or the sending module 1040 may be configured to provide, e.g. by being configured to send, capability information associated to sensor reporting to the network node 20.

The target device 10 may further be configured to obtain IMU measurements.

Therefore, according to the various embodiments described above, the target device 10 and/or the processing module 1001 and/or the obtaining module 1020 may be configured to obtain IMU measurements. In this case the obtaining unit 1020 may e.g. be an Inertial Measurement Unit.

The target device 10 may further be configured to obtain, from the network node 20, the reference position of the target device 10 comprised in the sensor reporting configuration.

Therefore, according to the various embodiments described above, the target device 10 and/or the processing module 1001 and/or the obtaining module 1020 and/or the receiving module 1010 may be configured to obtain the reference position of the target device (10) comprised in the sensor reporting configuration.

The target device 10 may further be configured to send, to the network node 20, the measurement report for the sensor measurements according to the determined reporting scope, wherein the measurement report further comprises the reference position of the target device (10).

Therefore, according to the various embodiments described above, the target device 10 and/or the processing module 1001 and/or the sending module 1040 may be configured to send the measurement report for the sensor measurements to the network node 20 according to the determined reporting scope, wherein the measurement report further comprises the reference position of the target device 10.

The target device 10 is further configured to obtain an orientation of the target device 10 at the reference position.

Therefore, according to the various embodiments described above, the target device 10 and/or the processing module 1001 and/or the obtaining module 1020 may be configured to obtain an orientation of the target device 10 at the reference position.

The target device 10 is further configured to obtain magnetometer measurements, light sensor measurements and/or associated measurements.

Therefore, according to the various embodiments described above, the target device 10 and/or the processing module 1001 and/or the obtaining module 1020 may be configured to obtain magnetometer measurements, light sensor measurements and/or associated measurements.

With reference to FIG. 11, a schematic block diagram of embodiments of the network node 20 of FIG. 2 is shown. Dashed lines in the figure indicate that these boxes are optional.

The network node 20 may comprise a processing module 2001, such as a means for performing the methods described herein. The means may be embodied in the form of one or more hardware modules and/or one or more software modules The network node 20 may further comprise a memory 2002. The memory may comprise, such as contain or store, instructions, e.g. in the form of a computer program 2003, which may comprise computer readable code units.

According to some embodiments herein, the network node 20 and/or the processing module 2001 comprises a processing circuit 2004 as an exemplifying hardware module. Accordingly, the processing module 2001 may be embodied in the form of, or 'realized by', the processing circuit 2004. The instructions may be executable by the processing circuit 2004, whereby the network node 20 may be operative to perform the methods of FIG. 4b and/or FIG. 9. As another example, the instructions, when executed by the network node 20 and/or the processing circuit 2004, may cause the network node 20 to perform the method according to FIG. 4b and/or FIG. 9.

In view of the above, in one example, there is provided a network node 20 for performing a method for positioning the target device 10. As mentioned, the network node 20 may be configured to perform the method steps disclosed in FIGS. 4b and 9.

Again, the memory 2002 may contain the instructions executable by said processing circuit 2004 whereby the network node 20 may be operative for:

sending, to the target device 10, a sensor reporting configuration, obtaining, from the target device 10, sensor measurements according to a reporting scope determined by the target device based on the sent sensor reporting configuration.

The memory 2002 may further contain the instructions executable by said processing circuit 2004, whereby the network node 20 may further be operative for:

sending, to the target device 10, a capability request associated to sensor reporting, obtaining, from the target device 10, capability information associated to sensor reporting.

determining an absolute position of the target device 10 based on the obtained sensor measurements.

FIG. 11 further illustrates a carrier 2005, or program carrier, which comprises the computer program 2003 as described directly above.

In some embodiments, the processing module 2001 comprises an Input/Output module 2006, which may be exemplified by a receiving module and/or a sending module as described below when applicable.

In further embodiments, the network node 20 and/or the processing module 2001 may comprise one or more of a receiving module 2010, an obtaining module 2020, a determining module 2030, and a sending module 2040 as exemplifying hardware modules. In other examples, one or more of the aforementioned exemplifying hardware modules may be implemented as one or more software modules.

Accordingly, the network node 20 may be configured to send, to the target device 10, a sensor reporting configuration.

Therefore, according to the various embodiments described above, the network node 20 and/or the processing module 2001 and/or the sending module 2020 may be configured to send, to the target device 10, a sensor reporting configuration.

Furthermore, the network node 20 may be configured to obtain, from the target device 10, a measurement report comprising sensor measurements according to a reporting scope determined by the target device 10 based on the sent sensor reporting configuration, wherein the measurement report comprises a displacement of the target device 10 relative to a reference position.

Therefore, according to the various embodiments described above, the network node 20 and/or the processing module 2001 and/or the obtaining module 2020 may be configured for obtain, from the target device 10, a measurement report comprising sensor measurements according to a reporting scope determined by the target device 10 based on the sent sensor reporting configuration, wherein the measurement report comprises a displacement of the target device 10 relative to a reference position.

The network node 20 may further be configured for sending, to the target device 10, a capability request associated to sensor reporting.

Therefore, according to the various embodiments described above, the network node 20 and/or the processing module 2001 and/or the sending module 2040 may be configured to send, to the target device 10, a capability request associated to sensor reporting, The network node 20 may further be configured to obtain, from the target device 10, capability information associated to sensor reporting.

Therefore, according to the various embodiments described above, the network node 20 and/or the processing module 2001 and/or the obtaining module 2020 may be configured to obtain, from the target device 10, capability information associated to sensor reporting.

The network node 20 may further be configured to obtain, from the target device 10, the measurement report, wherein the measurement report comprises IMU measurements.

Therefore, according to the various embodiments described above, the network node 20 and/or the processing module 2001 and/or the obtaining module 2020 may be configured to obtain the measurement report, wherein the measurement report comprises IMU measurements.

The network node 20 may further be configured to obtain, from the target device 10, the measurement report, wherein the measurement report comprises the reference position of the target device 10.

Therefore, according to the various embodiments described above, the network node 20 and/or the processing module 2001 and/or the obtaining module 2020 may be configured to obtain the measurement report, wherein the measurement report comprises the reference position of the target device 10.

The network node 20 may further be configured to obtain, from the target device 10, the measurement report, wherein the measurement report comprises the orientation of the target device 10 at the reference position.

Therefore, according to the various embodiments described above, the network node 20 and/or the processing module 2001 and/or the obtaining module 2020 may be configured to obtain the measurement report, wherein the measurement report comprises the orientation of the target device 10 at the reference position.

The network node 20 may further be configured to obtain, from the target device 10, the measurement report, wherein the measurement report comprises magnetometer measurements, light sensor measurements and/or associated measurements.

Therefore, according to the various embodiments described above, the network node 20 and/or the processing module 2001 and/or the obtaining module 2020 may be configured to obtain the measurement report, wherein the measurement report comprises magnetometer measurements, light sensor measurements and/or associated measurements The network node 20 may further be configured for determining an absolute position of the target device 10 based on the obtained sensor measurements.

Therefore, according to the various embodiments described above, the network node 20 and/or the processing module 2001 and/or the determining module 1030 may be configured for determining an absolute position of the target device 10 based on the obtained sensor measurements.

The methods according to the embodiments described herein for the target device and the network node may be respectively implemented by means of e.g. a computer program or a computer program product, comprising instructions, i.e., software code portions, which, when executed on at least one processor, cause the at least one processor to carry out the actions described herein, as performed by the target device 10 or network node 20. The computer program may be stored on a computer-readable storage medium, e.g. a disc or similar. The computer-readable storage medium, having stored thereon the computer program, may comprise the instructions which, when executed on at least one processor, cause the at least one processor to carry out the actions described herein, as performed by the target device or the network node. In some embodiments, the computer-readable storage medium may be a non-transitory computer-readable storage medium.

Those skilled in the art will also appreciate that the Input/Output module 1006, 2006, the processing module 1001, 2001, the receiving module 1010, 2010, the obtaining module 1020, 2020, the determining module 1030, 2030, the sending module 1040, 2040, described above may refer to a combination of analog and digital circuits, and/or one or more processors configured with software and/or firmware, e.g. stored in the memory 1002, 2002, that when executed by the one or more processors such as the processing unit as described above perform actions according to any of the above actions as performed by the target device 10 or the network node 20. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The network node 20 described in the embodiments herein may also be implemented by means of resources in a cloud-like environment, commonly referred to as "the cloud". Although the method actions performed by the network node 20 herein are discussed in the context of a radio access node, the method may also be performed by a core network node or a distributed node comprised in a first cloud, such as e.g. a server and/or a datacenter. The method actions may e.g. be performed by a logical function, which may be a centralized service hosted on the core network node or the distributed node.

When using the word "comprise" or "comprising" it shall be interpreted as non-limiting, i.e. meaning "consist at least of".

Further examples and embodiments may be defined as in the following paragraphs:

Embodiments herein may further relate to:
1. A target device (10), for performing a method for determining a location of the target device (10) is operative to:
   obtain, from a network node (20), a sensor reporting configuration,
   obtain sensor measurements,
   determine a reporting scope based on the obtained sensor measurements according to the obtained sensor reporting configuration,
   send, to the network node (20), a measurement report comprising the sensor measurements according to the determined reporting scope, wherein the measurement report comprises a displacement of the target device (10) relative to a reference position.
2. The target device (10) according to paragraph 1, wherein the target device (10) is further operative to:
   obtain, from the network node (20), a capability request associated to sensor reporting,
   provide, to the network node (20), capability information associated to sensor reporting.
3. The target device (10) according to paragraph 1 or 2, wherein target device (10) is further operative to obtain Inertial Measurement Unit, IMU, measurements.
4. The target device (10) according to any of the previous paragraphs, wherein the target device (10) is further operative to receive the sensor reporting configuration from the network node (20) comprising the reference position of the target device (10).
5. The target device (10) according to any of the previous paragraphs, wherein the target device (10) is further operative to send the measurement report to the network node (20) comprising the reference position of the target device (10).
6. The target device (10) according to any of the previous paragraphs, wherein the target device (10) is further operative to obtain sensor measurements comprising an orientation of the target device (10) at the reference position.
7. The target device (10) according to any of the previous paragraphs, wherein the target device (10) is further operative to obtain magnetometer measurements, light sensor measurements and/or associated measurements.
8. A network node (20), for performing a method for determining a location of a target device (10), comprising a processor and a memory, said memory containing instructions executable by said processor wherein said target device (10) is operative to:
   send, to the target device (10), a sensor reporting configuration,
   obtain, from the target device (10), a measurement report comprising sensor measurements according to a reporting scope determined by the target device (10) based on the sent sensor reporting configuration, wherein the measurement report comprises a displacement of the target device (10) relative to a reference position.
9. The network node (20) according to paragraph 8, wherein the network node (20) is further operative to:
   send, to the target device (10), a capability request associated to sensor reporting,
   obtain, from the target device (10), capability information associated to sensor reporting.
10. The network node (20) according to paragraph 8 or 9, wherein the network node (20) is further operative to obtain sensor measurements comprising Inertial Measurement Unit, IMU, measurements from the target device (10).
11. The network node (20) according to any of the paragraphs 8 to 10, wherein the network node (20) is further operative to obtain sensor measurements comprising the reference position of the target device (10) from the target device (10).
12. The network node (20) according to any of the paragraphs 8 to 11, wherein the network node (20) is further operative to obtain sensor measurements from the target device (10), comprising an orientation of the target device (10) at the reference position.
13. The network node (20) according to any of the paragraphs 8 to 12, wherein the network node (20) is further operative to obtain sensor measurements comprising magnetometer measurements, light sensor measurements and/or associated measurements from the target device (10).
14. The network node (20) according to any of the paragraphs 8 to 13, wherein the network node (20) is further operative to determine an absolute position of the target device (10) based on the obtained sensor measurements.

Embodiments herein may according to a second example also relate to:
15. A target device (10), for performing a method for determining a location of the target device (10), comprising:
   an obtaining module (1020) configured to obtain, from a network node (20), a sensor reporting configuration,
   the obtaining module (1020) further configured to obtain sensor measurements,
   a determining module (1030) configured to determine a reporting scope based on the obtained sensor measurements according to the obtained sensor reporting configuration,
   a sending module (1040) configured to send, to the network node (20), a measurement report comprising the sensor measurements according to the determined reporting scope, wherein the measurement report comprises a displacement of the target device (10) relative to a reference position.
16. The target device (10) according to paragraph 15, wherein the target device (10) further comprises:
   the obtaining module (1020) configured to obtain, from the network node (20), a capability request associated to sensor reporting,
   the sending module (1040) configured to provide, to the network node (20), capability information associated to sensor reporting.
17. The target device (10) according to paragraphs 15 or 16, comprising the obtaining module (1020) configured to obtain sensor measurements comprising Inertial Measurement Unit, IMU, measurements.
18. The target device (10) according to any of the paragraphs 14 to 17, comprising the sending module (1040) configured to receive the sensor reporting configuration from the network node (20) comprising the reference position of the target device (10).
19. The target device (10) according to any of the paragraphs 14 to 18, comprising the sending module (1040) configured to send the measurement report to the network node (20) comprises the reference position of the target device (10).
20. The target device (10) according to any of the paragraphs 14 to 19, comprising the obtaining module (1020) configured to obtain the sensor measurements comprising an orientation of the target device (10) at an initial measurement position.
21. The target device (10) according to any of the paragraphs 14 to 20, comprising the sending module (1040) configured to obtain the sensor measurements comprising magnetometer measurements, light sensor measurements and/or associated measurements.
22. A network node (20), for performing a method for determining a positioning of a target device (10), comprising:
  a sending module (2030) configured to send, to the target device (10), a sensor reporting configuration,
  an obtaining module (2020) configured to obtain, from the target device (10), a measurement report comprising sensor measurements according to a reporting scope determined by the target device (10) based on the sent sensor reporting configuration, wherein the measurement report comprises a displacement of the target device (10) relative to a reference position.
23. The network node (20) according to paragraph 22, further comprising:
  the sending module (2030) further configured to send, to the target device (10), a capability request associated to sensor reporting,
  the obtaining module (2020) further configured to obtain, from the target device (10), capability information associated to sensor reporting.
24. The network node (20) according to paragraph 22 or 23, further comprising the obtaining module (2020) further configured to obtain sensor measurements comprising Inertial Measurement Unit, IMU, measurements.
25. The network node (20) according to any of the paragraphs 22 to 24, further comprising the obtaining module (2020) further configured to obtain sensor measurements comprising the reference position of the target device (10).
26. The network node (20) according to any of the paragraphs 22 to 25, further comprising the obtaining module (2020) further configured to obtain sensor measurements comprising an orientation of the target device (10) at the reference position.
27. The network node (20) according to any of the paragraphs 22 to 26, further comprising the obtaining module (2020) further configured to obtain sensor measurements comprising magnetometer measurements, light sensor measurements and/or associated measurements.
28. The network node (20) according to any of the paragraphs 22 to 27, further comprising the determining module (2020) further configured to determine an absolute position of the target device (10) based on the obtained sensor measurements.

The objectives of the work item [1], i.e. RP-170813, New WID: UE Positioning Accuracy Enhancements for LTE, is to specify solutions for positioning enhancements in LTE in respect of positioning accuracy, availability, reliability and scalability, for both Normal UEs and BL UEs. One of the agreements is to
  Specify support for IMU positioning:
    Specify the signalling and procedure to support IMU positioning over LPP and hybrid positioning including IMU related estimates. [RAN2, RAN1]
  Also, the following were agreed during RAN2 #98 meeting:
    Only support hybrid positioning for IMU as mentioned in WID scope.

This contribution further discusses the IMU measurements and the related signaling aspects.

The Inertial Measurement Unit (IMU) may enable the location server to estimate the target device trajectory between, after, or during an OTDOA/E-CID positioning session, and may reduce the need of frequent OTDOA/E-CID measurements. The use of IMU data together with position estimate is illustrated in FIG. 2.

IMU data may also indicate the environment of a target device, where a high speed target device is more probable to be located outdoors. In order to fuse the radio measurements with the IMU data, the data reported from the IMU equipped target device 10 may be aligned with a standardized earth bounded coordinate system. Therefore, to get the target device position in world-coordinates, the orientation of the target device is needed. A common method to determine the orientation is to use gyroscope, magnetometer and accelerometer. After the orientation is estimated, the orientation and accelerometer may be used to estimate the acceleration relative the coordinate system (accelerometer minus gravity). By having the relative acceleration, it is possible to estimate the relative displacement of the device by for example double integration. However, target device implementations may consider more accurate displacement estimation methods. Some of the steps above may already be supported by UEs, and hence it would be beneficial in terms of hybrid positioning to receive these IMU measurement reports at the location server. Therefore in the signalling, the capabilities of the target device may be considered in terms of measuring and reporting all these parameters. The device capabilities may be separated into a:
  Device that can estimate relative distance,
  Device that can estimate relative acceleration in earth bounded world-coordinates,
  Device that can measure raw IMU data The support of different device types may be considered and the reporting format may reflect each device type.

Some target devices may have capabilities to estimate a relative position, by for example using Pedestrian Dead Reckoning (PDR), or by double integration of a linear acceleration. However, the acceleration may not be constant or linear over the considered time window between positioning reports. Therefore, it may be relevant to segment the time window into multiple time segments, each with an assessment about the IMU measurement that may be described with a reasonable complexity. Just to illustrate the situation, an example IMU measurement is described in relation to FIGS. 5 to 7 herein. In case of target device 10 reporting multiple relative displacements, a target device trajectory can enable the E-SMLC to better predict a future target device position without requiring frequent RSTD measurements according to FIG. 2, or when no other positioning measurements are available. The format of the relative displacement report may therefore support more than a single relative displacement measure, and also include an associated relative displacement uncertainty measurement.

| Proposal 1 | Capable target devices may be requested to report relative displacement based on IMU measurements |
|---|---|
| Proposal 2 | Support multiple relative displacements in the relative displacements report |
| Proposal 3 | Support relative displacement uncertainty |

Some target devices 10 may have capabilities to estimate the acceleration in earth-bound world coordinates. The acceleration reporting frequency may need to reflect the target device motion characteristics. More specifically, in order to accurately estimate the target device trajectory, the target device 10 may report multiple time segments, where each segments are the piece-wise linear or constant acceleration between two points in time. Given a relative constant or linear acceleration between multiple time points, a target device trajectory may be estimated at the location server. The report of relative acceleration may need to be reported in a standardized earth bounded coordinate system, preferably the coordinate system used to describe velocity defined in [3], where a bearing and horizontal speed is specified. It is proposed that the relative acceleration report follows the same coordinate system, and to add an acceleration description to [3]. The report may also comprise an uncertainty measurement of each sample.

| Proposal 4 | Introduce an acceleration description in [3] in accordance with the coding examples provided below. |
|---|---|
| Proposal 5 | Capable target devices may be requested to report relative acceleration and associated uncertainty. |

Since the IMU data is a relative measurement, a common element among the device types should be a time stamp indicating the time of each IMU measurement.

Proposal 6 Introduce a Time Stamp Indicating the Time of IMU Measurement.

When the target device 10 is only capable of measuring raw IMU data it may need to report both magnetometer, gyroscope and accelerometer data in order to enable the network, such as the network node 20, to translate the measurements into world-coordinates.

The reporting needed to support reporting of displacement and relative acceleration is described in the related CRs [4] and [5].

| Proposal 1 | Capable target devices may be requested to report relative displacement based on IMU measurements |
|---|---|
| Proposal 2 | Support multiple relative displacements in the relative displacements report |
| Proposal 3 | Support relative displacement uncertainty |
| Proposal 4 | Introduce an acceleration description in [3] according to CR [5]. |
| Proposal 5 | Capable target devices may be requested to report relative acceleration and associated uncertainty. |
| Proposal 6 | Introduce a time stamp indicating the time of IMU measurement. |

REFERENCES

[1] RP-170813, New WID: UE Positioning Accuracy Enhancements for LTE.
[2] 3GPP TS 36.355, LTE Positioning Protocol (LPP) (Release 14)
[3] 3GPP TS 23.032
[4] 36355_change_request
[5] 23032_change_request Introduce Rel.15 IMU sensor messages in LPP. The Rel.13 sensor information was about barometric sensor pressure, while the Rel.15 contain the reporting of accelermeter, magnetometer and gyroscope. The UE should also report its assumed IMU reference point together with reporting the measurements.

The change includes:
Supporting relative displacement report
Support acceleration measures report
Such support may be needed for the enhancement of UE-assisted IMU positioning.
ProvideLocationInformation:
The ProvideLocationInformation message body in a LPP message is used by the target device to provide positioning measurements or position estimates to the location server.

```
-- ASN1START
ProvideLocationInformation ::= SEQUENCE {
    criticalExtensions              CHOICE {
        c1                          CHOICE {
            provideLocationInformation-r9 ProvideLocationInformation-r9-IEs,
            spare3 NULL, spare2 NULL, spare1 NULL
        },
        criticalExtensionsFuture   SEQUENCE { }
    }
}
ProvideLocationInformation-r9-IEs ::= SEQUENCE {
    commonIEsProvideLocationInformation
                                    CommonIEsProvideLocationInformation         OPTIONAL,
    a-gnss-ProvideLocationInformation    A-GNSS-ProvideLocationInformation       OPTIONAL,
    otdoa-ProvideLocationInformation     OTDOA-ProvideLocationInformation        OPTIONAL,
    ecid-ProvideLocationInformation      ECID-ProvideLocationInformation         OPTIONAL,
    epdu-ProvideLocationInformation         EPDU-Sequence                        OPTIONAL,
    ...,
    [[
    sensor-ProvideLocationInformation-r13
                                    Sensor-ProvideLocationInformation-r13
    sensor-ProvideLocationInformation-r15                                        OPTIONAL,
                                    Sensor-ProvideLocationInformation-r15
                                                                                 OPTIONAL,
    tbs-ProvideLocationInformation-r13   TBS-ProvideLocationInformation-r13   OPTIONAL,
```

| | | |
|---|---|---|
| wlan-ProvideLocationInformation-r13 | WLAN-ProvideLocationInformation-r13 | OPTIONAL, |
| bt-ProvideLocationInformation-r13 | BT-ProvideLocationInformation-r13 | OPTIONAL |
| ]] | | |
| } | | |

Sensor Location Information:
Sensor-ProvideLocationInformation:
The IE Sensor-ProvideLocationInformation is used by the target device to provide location information for sensor-based methods to the location server. It may also be used to provide sensor specific error reason.

```
-- ASN1START
Sensor-ProvideLocationInformation-r13 ::= SEQUENCE {
    sensor-MeasurementInformation-r13    Sensor-MeasurementInformation-r13
        OPTIONAL,
    sensor-Error-r13                     Sensor-Error-r13
        OPTIONAL,
    ...
}
Sensor-ProvideLocationInformation-r15 ::= SEQUENCE {
    sensor-MeasurementInformation-r15    Sensor-MeasurementInformation-r15
        OPTIONAL,
    ...
}
         -- ASN1STOP        Sensor Location Information Elements
```

Sensor-MeasurementInformation:
The IE Sensor-MeasurementInformation may be used by the target device to provide UE sensor measurements to the location server.

```
-- ASN1START
Sensor-MeasurementInformation-r13 ::= SEQUENCE {
    measurementReferenceTime-r13         UTCTime                 OPTIONAL,
    uncompensatedBarometricPressure-r13  INTEGER (30000.. 115000) OPTIONAL, --
Cond Barometer
    ...,
    [[
    uncertainty-r14                      SEQUENCE {
                                         range-r14       INTEGER (0..1000),
                                         confidence-r14  INTEGER (1 ..100)
                                         }                       OPTIONAL
    ]]
}
-- ASN1STOP
```

| Conditional presence | Explanation |
|---|---|
| Barometer | The field is mandatory present if the Sensor-MeasurementInformation is provided for barometric pressure; otherwise it is not present. |

Sensor-MeasurementInformation field descriptions measurementReferenceTime
This field provides the UTC time when the sensor measurements are performed and should take the form of YYMMDDhhmmssZ.
uncompensatedBarometricPressure
This field provides the uncompensated barometric pressure as measured by the UE sensor, in units of Pa.
uncertainty

| Sensor-MeasurementInformation field descriptions |
| --- |
| This field provides the expected range for the pressure measurement in units of Pa and the confidence as a percentage that the true pressure lies in a range of (measurement − range) to (measurement + range). |

```
-- ASN1START
Sensor-MeasurementInformation-r15 ::= SEQUENCE {
    measurementReferenceTime-r15 UTCTime         OPTIONAL,
    IMU-position-point  LocationCoordinates      OPTIONAL,
    acceleration              HorizontalWithVerticalAccelerationAndUncertainty OPTIONAL,
}
-- ASN1STOP
```

| Sensor-MeasurementInformation field descriptions |
| --- |
| measurementReferenceTime<br>This field provides the UTC time when the sensor measurements are performed and should take the form of YYMMDDhhmmssZ.<br>IMU-position-point<br>This field provides the reference position using one of the geographic shapes defined in 3GPP TS 23.032 [15], Coding of the values of the various fields internal to each geographic shape follow the rules in [15],<br>Acceleration<br>This field provides an acceleration estimate using one of the acceleration shapes defined in 3GPP TS 23.032 [15], Coding of the values of the various fields internal to each acceleration shape follow the rules in [15]. |

HorizontalVelocity

The IE HorizontalVelocity is used to describe a velocity shape as defined in 3GPP TS 23.032 [15].

```
-- ASN1START
HorizontalVelocity ::= SEQUENCE {
    bearing                INTEGER(0..359),
    horizontalSpeed        INTEGER(0..2047)
}
-- ASN1STOP
```

HorizontalWithVerticalVelocity

The IE HorizontalWithVerticalVelocity is used to describe a velocity shape as defined in 3GPP TS 23.032 [15].

```
-- ASN1START
HorizontalWithVerticalVelocity ::= SEQUENCE{
    bearing             INTEGER(0..359),
    horizontalSpeed     INTEGER(0..2047),
    verticalDirection   ENUMERATED{upward, downward},
    verticalSpeed       INTEGER(0..255)
}
-- ASN1STOP
```

HorizontalVelocityWithUncertainty

The IE HorizontalVelocityWithUncertainty is used to describe a velocity shape as defined in 3GPP TS 23.032 [15].

```
-- ASN1START
HorizontalVelocityWithUncertainty ::= SEQUENCE {
    bearing                INTEGER(0..359),
    horizontalSpeed        INTEGER(0..2047),
    uncertaintyspeed       INTEGER(0..255)
}
-- ASN1STOP
```

HorizontalWithVerticalVelocityAndUncertainty

The IE HorizontalWithVerticalVelocityAndUncertainty is used to describe a velocity shape as defined in 3GPP TS 23.032 [15].

```
-- ASN1START
HorizontalWithVerticalVelocityAndUncertainty ::= SEQUENCE {
    bearing                    INTEGER(0..359),
    horizontalSpeed            INTEGER(0..2047),
    verticalDirection          ENUMERATED{upward, downward},
    verticalSpeed              INTEGER(0..255),
    horizontalUncertaintySpeed INTEGER(0..255),
    verticalUncertaintySpeed   INTEGER(0..255)
}
-- ASN1STOP
```

HorizontalWithVerticalAccelerationAndUncertainty

The IE HorizontalWithVerticalAccelerationAndUncertainty is used to describe an acceleration shape as defined in 3GPP TS 23.032 [15].

```
-- ASN1START
HorizontalWithVerticalVelocityAndUncertainty ::= SEQUENCE {
    bearing                    INTEGER(0..359),
    horizontalAcceleration     INTEGER(0..2047),
    verticalDirection          ENUMERATED{upward, downward},
    verticalAcceleration       INTEGER(0..255),
    horizontalUncertaintyspeed INTEGER(0..255),
    verticalUncertaintySpeed   INTEGER(0..255)
}
-- ASN1STOP
```

The invention claimed is:

1. A method, performed by a target device, for handling positioning of the target device, the method comprising:
   obtaining, from a network node, a sensor reporting configuration, the sensor reporting configuration indicating a reference position of the target device;
   obtaining sensor measurements, the sensor measurements comprising Inertial Measurement Unit (IMU) measurements relative to a reference position of the target device;
   determining a reporting scope based on the sensor measurements according to the sensor reporting configuration; and
   sending, to the network node, a measurement report comprising the sensor measurements according to the reporting scope.

2. The method according to claim 1, wherein the method further comprises: obtaining, from the network node, a capability request associated to sensor reporting; and providing, to the network node, capability information associated to sensor reporting.

3. The method according to claim 1, wherein the sensor measurements further comprise at least one of magnetometer measurements and light-sensor measurements that are associated with the IMU measurements.

4. A method, performed by a network node, for handling positioning of a target device, the method comprising:
sending, to the target device, a sensor reporting configuration; and
obtaining, from the target device, a measurement report comprising sensor measurements according to a reporting scope determined by the target device based on the sensor reporting configuration, the sensor measurements comprising Inertial Measurement Unit (IMU) measurements relative to a reference position of the target device.

5. The method according to claim 4, wherein the method further comprises: sending, to the target device, a capability request associated to sensor reporting; and obtaining, from the target device, capability information associated to sensor reporting.

6. The method according to claim 4, wherein the sensor measurements further comprise at least one of magnetometer measurements and light-sensor measurements that are associated with the IMU measurements.

7. The method according to claim 4, wherein the method further comprises determining an absolute position of the target device, based on the sensor measurements.

8. A target device, for performing a method for determining a location of the target device, wherein the target device is configured to:
obtain, from a network node, a sensor reporting configuration, the sensor reporting configuration indicating a reference position of the target device;
obtain sensor measurements, the sensor measurements comprising Inertial Measurement Unit (IMU) measurements relative to a reference position of the target device;
determine a reporting scope based on the obtained sensor measurements according to the obtained sensor reporting configuration; and
send, to the network node, a measurement report comprising the sensor measurements according to the determined reporting scope.

9. The target device according to claim 8, wherein the target device is further configured to:
obtain, from the network node, a capability request associated to sensor reporting; and provide, to the network node, capability information associated to sensor reporting.

10. The target device according to claim 8, wherein the sensor measurements further comprise at least one of magnetometer measurements and light-sensor measurements that are associated with the IMU measurements.

11. A network node, for performing a method for determining a location of a target device, wherein the network node is configured to:
send, to the target device, a sensor reporting configuration; and
obtain, from the target device, a measurement report comprising sensor measurements according to a reporting scope determined by the target device based on the sent sensor reporting configuration, the sensor measurements comprising Inertial Measurement Unit (IMU) measurements relative to a reference position of the target device.

12. The network node according to claim 11, wherein the network node is further configured to:
send, to the target device, a capability request associated to sensor reporting; and obtain, from the target device, capability information associated to sensor reporting.

13. The network node according to claim 11, wherein the sensor measurements further comprise at least one of magnetometer measurements and light-sensor measurements that are associated with the IMU measurements.

14. The network node according to claim 11, wherein the network node is configured to determine an absolute position of the target device, based on the sensor measurements.

* * * * *